United States Patent [19]
Aoki et al.

[11] 3,923,977
[45] Dec. 2, 1975

[54] ANTIBIOTIC FR-1923 SUBSTANCE

[75] Inventors: Hatsuo Aoki; Junji Hosoda, both of Ikeda; Tadaaki Komori, Takatsuki; Manabu Izeki; Yoshiaki Kubochi, both of Takarazuka; Takashi Kamiya, Suita; Hiroshi Imanaka, Ikeda, all of Japan

[73] Assignee: Fujisawa Pharmaceutical Co., Ltd., Osaka, Japan

[22] Filed: Apr. 5, 1974

[21] Appl. No.: 458,211

Related U.S. Application Data

[63] Continuation-in-part of Ser. No. 284,634, Aug. 29, 1972, abandoned.

[52] U.S. Cl. .................................. 424/118; 195/80
[51] Int. Cl.² ......................................... A61K 35/00

[58] Field of Search ...................... 424/118; 195/80

[56] References Cited
OTHER PUBLICATIONS

Millev, Pfizer Handbook of Microbial Metabolites, McGraw–Hill Book Co., Inc., N.Y., N.Y., p. 352.

*Primary Examiner*—Jerome D. Goldberg

[57] ABSTRACT

An antibiotic FR-1923 substance which is active against a pathogenic bacteria and useful as an effective antimicrobial agent in treatment of infections disease caused by bacteria, the antibiotic FR-1923 substance being produced by fermentation of *Nocardia uniformis* var. tsuyamanensis ATCC 21806 and its mutant in a nutrient medium.

8 Claims, 4 Drawing Figures

FIG. 1

ULTRAVIOLET SPECTRUM
OF FR-1923
IN PHOSPHATE BUFFER

FIG. 2

FIG. 3

ULTRAVIOLET SPECTRUM
OF THE SODIUM SALT
OF FR-1923 IN WATER (———)
IN SODIUM HYDROXIDE SOLUTION (-----)

FIG. 4 INFRARED SPECTRUM OF THE SODIUM SALT OF FR-1923 IN NUJOL MULL

ANTIBIOTIC FR-1923 SUBSTANCE

CROSS-REFERENCE TO RELATED APPLICATION

This invention is a continuation-in-part application of copending application Ser. No. 284,634, filed Aug. 29, 1972, now abandoned.

DETAILED DESCRIPTION

This invention relates to a novel compound having antibiotic properties. More particularly, it relates to a novel antibiotic FR-1923 substance, to a process for the production, to a pharmaceutical composition comprising the same and to a method of using the same in therapeutical treatment of infections.

It is one object of this invention to provide a novel effective antibiotic FR-1923 substance which is active against microorganisms, especially gram-negative bacteria, for example, the genera Pseudomonas and Proteus.

Another object of this invention is to provide a process for the production of the antibiotic FR-1923 substance by fermentation of a FR-1923 substance producing strain belonging to *Nocardia uniformis* and its mutants in a nutrient medium.

A further object of this invention is to provide a pharmaceutical composition comprising, as an effective agent, the antibiotic FR-1923 substance or the alkali metal salt thereof.

Still another object of this invention is to provide a method of treating infectious diseases caused by bacteria in mammal.

THE MICROORGANISM

The microorganism useful for the production of the new antibiotic FR-1923 substance is a variant of *Nocardia uniformis* newly isolated from a soil sample collected in Tsuyama City, Okayama Prefecture, Japan. A culture of the living organism has been deposited with, and added to a permanent stock culture collection of, the American Type Culture Collection, as the number ATCC 21806 and is hereinafter designated as *Nocardia uniformis* var. tsuyamanesis.

It is to be understood that, for the production of the new antibiotic, this invention is not limited to the use of the particular organism described herein, which is given for illustrative purpose. This invention also may include the use of mutants produced from the described organism by conventional means, such as X-rays, ultraviolet radiation and nitrogen mustards, etc.

*Nocardia uniformis* var. tsuyamanensis ATCC 21806 shows the following morphological, cultural and physiological characteristics.

1. Morphological characteristics:

The morphology of the culture was microscopically observed with mycelium growth on starch agar at 30°C for 10–15 days.

Type of branching of spore-forming hyphae
  Monopodial branching.
Form of spore-forming hyphae
  Straight or curved.
Number of Spore
  Several spores.
Surface appearance and size of spore:
  Smooth, $0.5 - 1 \times 0.5 - 1.5$ m$\mu$.
Existence of flagellum in spore
  Not observed.
Existence of sporangium
  Not observed.

2. Cultural characteristics

The strain has the following cultural characteristics when grown on media as indicated below for 10–15 days at 30°C.

| Medium | Color of aerial mycelium on surface of colonies | Color of vegetative mycelium | Diffusible pigment in medium |
|---|---|---|---|
| Sucrose-Nitrate agar | No aerial mycelium, flat growth | Orange-yellow | No pigment |
| Glucose-asparagine agar | No aerial mycelium | Yellow-Pale cream | No pigment |
| Glycerin-asparagine agar | Thin, pale yellow, powdery | Orange-yellow | No pigment |
| Starch agar | Thin, pale yellow, powdery | Orange-yellow | No pigment |
| Tyrosin agar | Thin, pale yellow, powdery | Yellow | No pigment |
| Nutrient agar | No aerial mycelium | Yellow | No pigment |
| Yeast malt agar | No aerial mycelium | Yellow, wrinkled leather like (yellowish brown on the reverse side) | No pigment |
| Oatmeal agar | No aerial mycelium | Brown-pale yellow (small colonies) | No pigment |

3. Physiological characteristics
  1. Range of temperature for growth:
    20° – 40°C., Optimum : 30°C.
  2. Liquefaction of gelatin (On glucose-peptone-gelatin agar):
    Faint
  3. Hydrolysis of starch (On starch agar)
    Strongly hydrolyzed
  4. Coagulation and peptonization of skim milk:
    Faint
  5. Production of melanin-like pigment
    (On tyrosin agar and peptone-yeast agar):
    Not observed
  6. Carbon source utilization patterns by the Pridham-Gottlieb method:

| Source of Carbon | Growth |
|---|---|
| L-Arabinose | ± |
| D-Xylose | ± |
| D-Glucose | + |
| D-Fructose | – |
| Sucrose | + |
| Inositol | – |
| L-Rhamnose | ± |
| Raffinose | – |
| D-Mannitol | ± |

+ = Good utilization
± = Probable utilization
– = No utilization

THE ANTIBIOTIC

The FR-1923 substance of this invention is produced when a FR-1923 substance-producing strain belonging to *Nocardia uniformis* is grown in a nutrient medium containing assimilable sources of carbon and of nitrogen, and an inorganic salt under controlled submerged aerobic conditions. The nutrient medium may be any one of a number of media which can be utilized by the FR-1923 substance-producing strain belonging to *Nocardia uniformis*.

The preferred sources of carbon in the nutrient medium are carbohydrates such as glucose, sucrose, glycerin and starch. Other sources which may be included are lactose, arabinose, xylose, rhamnose, mannitol, sugar, dextrin, molasses and the like.

The preferred sources of nitrogen are yeast extract, peptone, gluten meal, cottonseed meal, soybean meal, corn steep liquor, dried yeast, etc., as well as inorganic and organic nitrogen compounds such as ammonium salts (e.g. ammonium nitrate, ammonium sulphate, ammonium phosphate, etc.), urea and the like.

The carbon and nitrogen sources, though advantageously employed in combination, need not be used in their pure form because less pure materials, which contain traces of growth factors and considerable quantities of mineral nutrients, are also suitable for use. When desired, there may be added to the medium mineral salts such as calcium carbonate, sodium or potassium phosphate, sodium or potassium chloride, magnesium salt, copper salt and the like. If necessary, especially when the culture medium is foamed remarkably, a defoaming agent, such as liquid paraffin, fatty oil, plant oil, mineral oil and silicones may be added.

As is preferred for the production of other antibiotics in massive amounts, submerged aerobic cultural conditons are preferred for the production of the FR-1923 substance in massive amounts. For the production in small amounts, a shaking or surface culture in a flask or bottle is employed. Furthermore, when the growth is carried out in large tanks, it is preferable to use the vegetative form of the organism for inoculation in the production tanks in order to avoid growth lag in the process of production of the antibiotics. Accordingly, it is desirable first to produce a vegetative inoculum of the organism by inoculating a relatively small quantity of culture medium with spores or mycelia of the organism and culture them and to transfer the cultured vegetative inoculum aseptically to large tanks. The medium in which the vegetative inoculum is produced can be the substantially same as or different from medium utilized for the production of the FR-1923 substance.

Agitation and aeration of the culture mixture may be accomplished in a variety of ways. Agitation may be provided by a propeller or the similar mechanical agitation equipment, by revolving or shaking the fermenter, by various pumping equipment or by the passage of sterile air through the medium. Aeration may be effected by passing sterile air through the fermentation mixture.

The fermentation is usually conducted at a temperature about between 20°C. and 40°C., preferably 30°C., for a period of 30 hours to 50 hours.

The FR-1923 substance of this invention can be recovered from the culture medium by conventional means which are commonly used for the recovery of other antibiotics.

In general, most of the antibiotic produced is found in the cultured broth, and accordingly the antibiotic can be separated from the filtrate, which is obtained by filtrating or centrifuging the broth, by a conventional method, e.g. an extractive or adsorptive techniques.

Extraction is conducted by treating the filtrate with an organic solvent in which the antibiotic can be soluble, for example, pyridine, alcohols such as methanol, ethanol, butanol, etc., ketones such as acetone etc., or aqueous alcohol such as aqueous methanol, ethanol and butanol or with an alkaline aqueous solution such as aqueous pyridine, aqueous ammonium, aqueous sodium hydroxide and the like. Other solvents of similar character may also be used. Combination of these solvents are advantageously employed.

Alternatively, the antibiotic can be separated from the culture broth by making the antibiotic substance in the filtered broth adsorbed on adsorbing agents such as activated carbon, activated alumina, silica gel, magnesium aluminum silicate, ion exchange resin and cellulose powder, and by eluting the antibiotic adsorbed from the adsorbents by employing a polar, organic solvent in which the antibiotic substance is soluble.

The antibiotic may be isolated from the extract or the eluate thus obtained by adding a suitable solvent, in which the antibiotic is insoluble, to the solution or alternatively by adjusted pH of the solution to acidity, so that the antibiotic may be precipitated in the solution. In this isolation process, it is to be understood that, when desired, the extract or the eluate may be concentrated to a relatively small volume by evaporating the solvent. Thus isolated antibiotic is purified by a conventional method, e.g. recrystallization or chromatography.

In accordance with the present invention, the antibiotic FR-1923 substance is produced in the culture medium, and accordingly the antibiotic produced in the culture broth, can be isolated in the free form i.e., FR-1923 substance per se and when the solution or the concentrate is treated with an alkali metal material (e.g. sodium or potassium hydroxide) during the processes, i.e., extraction, isolation, or purification processes, may be isolated in the form of its alkali metal salts:

The FR-1923 substance obtained in its free form may be also converted to the alkali metal salt in such conventional manner.

The alkali metal salts of the FR-1923 substance obtained above may be easily converted to the FR-1923 substance in the free form by treatment with an acid such as a mineral acid (e.g. hydrochloric acid) in conventional manner.

Properties of the antibiotic which is isolated in this manner will be mentioned below.

The FR-1923 substance possesses the following physical and chemical properties:

The FR-1923 substance crystallizes in the form of white needles. It is very soluble in an alkaline solution (for example, aqueous ammonium, aqueous pyridine and aqueous sodium hydroxide) and dimethylsulfoxide, is sparingly soluble in water and methanol, and is insoluble in chloroform, ethyl acetate, and ethyl ether.

The elemental analysis of the sample, which prior to analysis was dried at 80°C in vacuo for 8 hours over phosphorus pentoxide, gave the following values:

| | per cent |
|---|---|
| Carbon | 54.31 |
| Hydrogen | 4.90 |
| Nitrogen | 10.71 |
| Oxygen (by difference) | 30.08 |

The molecular weight was measured by mass spectrum, vapor pressure depression method and the Rast method, but the definite result was not obtained.

FR-1923 substance is confirmed to have the following molecular formula.

$C_{23} H_{24} N_4 O_9$

The FR-1923 substance gradually changed to brown at 187°C and decomposes at 214° – 216°C.

Figure 1:
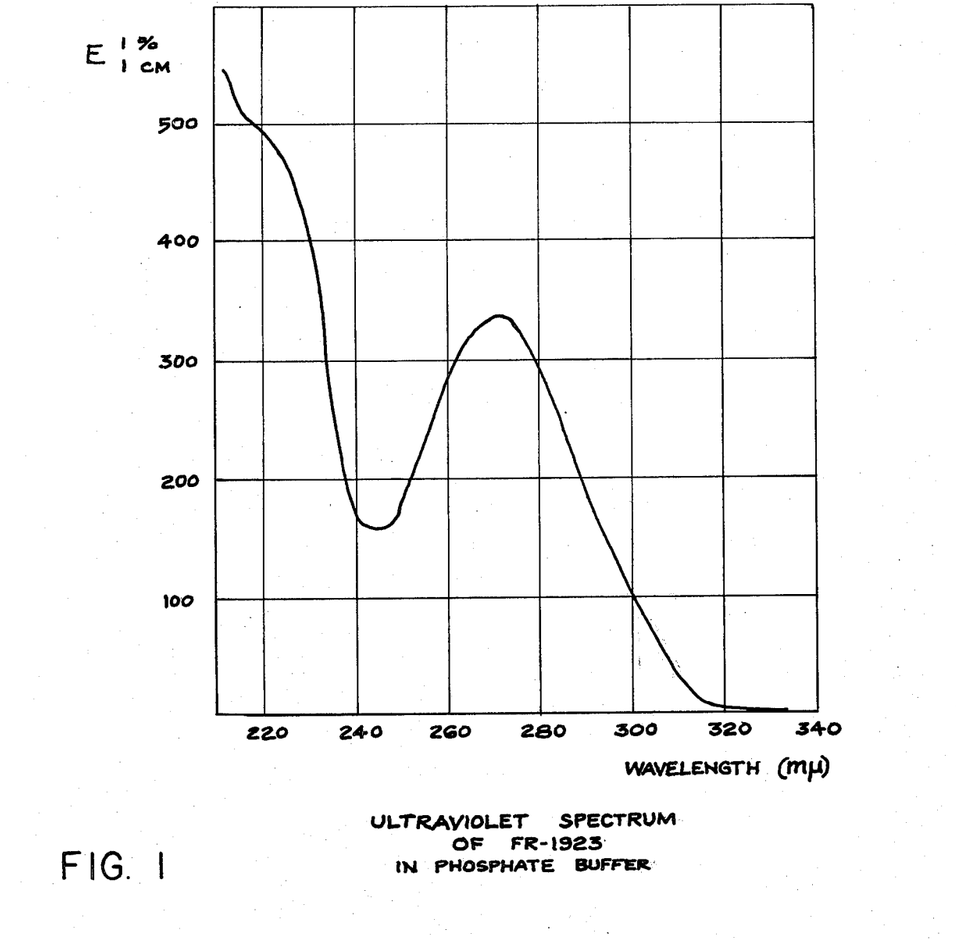

The ultra-violet absorption spectrum (solvent: 1/15M phosphate buffer solution (pH 8.0) ) as shown in FIG. 1 of the accompanying drawing shows shoulder at 220 m$\mu$ and maximum at 272 m$\mu$($E_{1cm}^{1\%}$ = 310).

Figure 2:
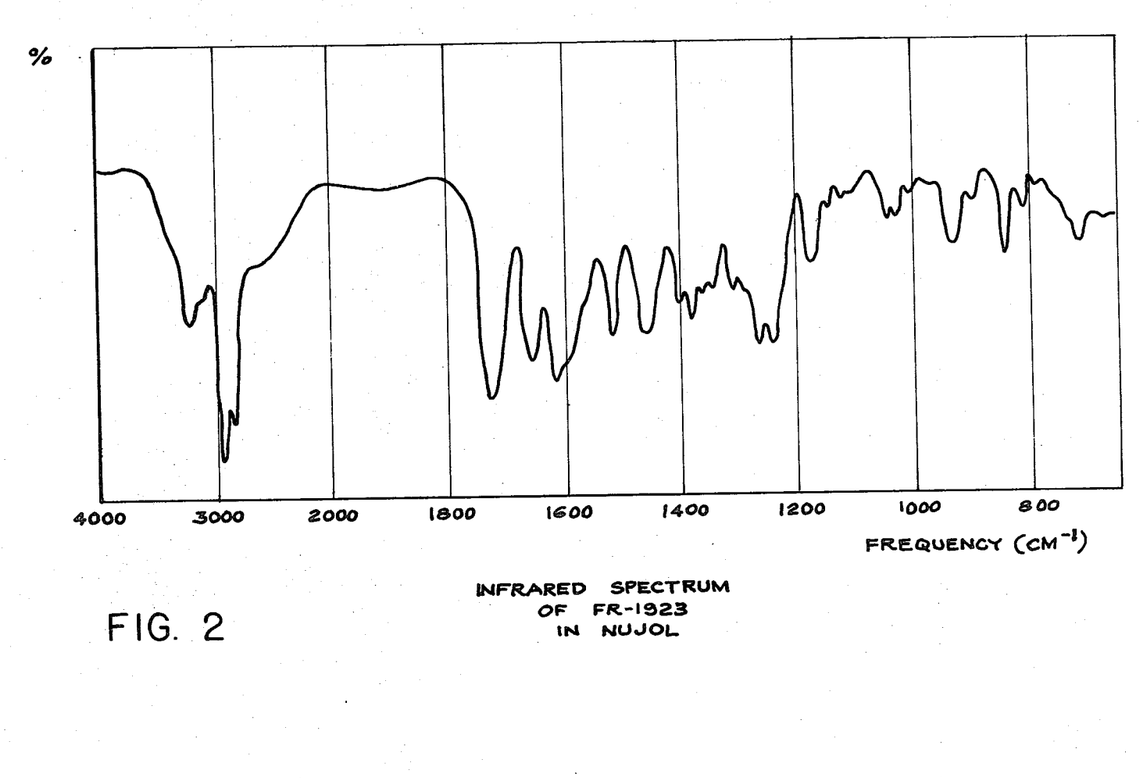

The infra-red absorption spectrum (suspended in Nujol mull) as shown in FIG. 2 gives peaks at the following frequency (cm$^{-1}$):

3450, 3250, 3200, 2700-2550, 1725, 1655, 1605, 1590 1560, 1510, 1395, 1260, 1240, 1220, 1175, 1045, 930 840, 810, 720.

The colour reactions of the FR-1923 substance are mentioned as follows: positive in ninhydrin, Dragendorff's and ferric chloride-pottasium ferricyanide tests; and negative in Ehrlich's, Molisch's, Fehling and Tollen's tests.

The FR-1923 substance is unstable in both alkaline and acidic solutions.

The FR-1923 substance is amphoteric, showing acidity in character in a aqueous methanol.

Sodium salt of the FR-1923 substance possesses the following physical and chemical properties:

The sodium salt of the FR-1923 substance crystallizes in the form of white needles. It is soluble in water, is sparingly soluble in methanol and acetone, and is insoluble in chloroform, ethyl acetate, and n-hexane.

The elemental analysis of sample which, prior to analysis was dried at 80°C. in vacuo for 8 hours over phosphorus pentoxide gave the following values:

| | per cent |
|---|---|
| Carbon | 51.78 |
| Hydrogen | 4.99 |
| Nitrogen | 10.36 |
| Sodium | 4.26 |
| Oxygen (by difference) | 28.61 |

The sodium salt of the FR-1923 substance gradually changes to brown at 220°C. and decomposes at 234°-235°C.

The specific rotation is as follows:

$[\alpha]_D^{20} = -135°$ (c=1 in water).

Figure 3:
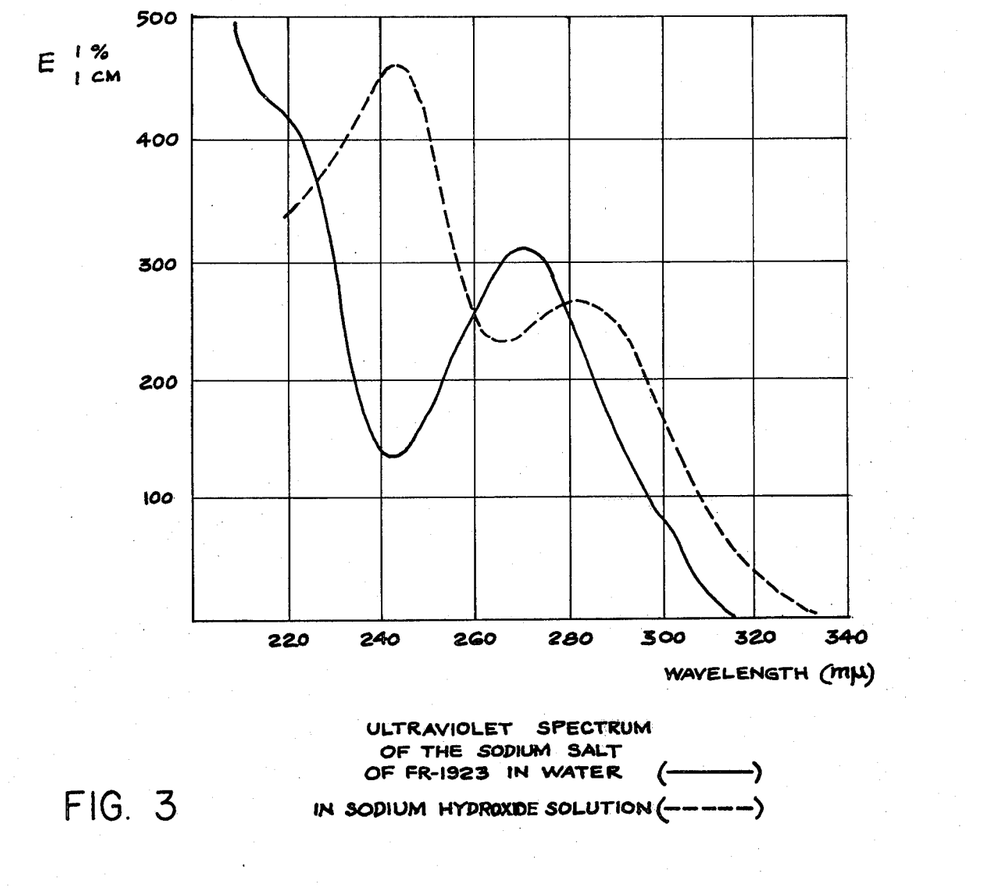

The ultra-violet absorption spectrum (solvent: water) as shown by a solid line in FIG. 3 shows shoulder at 220 m$\mu$ and maximum at 272 m$\mu$ ($E_{1cm}^{1\%}$ = 305). The ultraviolet absorption spectrum (solvent: 0.1N aqueous sodium hydroxide) as shown by a dotted line in FIG. 3 possesses maxima at 244 m$\mu$ ($E_{1cm}^{1\%}$ = 460) and 283 m$\mu$ ($E_{1cm}^{1\%}$ = 270).

Figure 4:
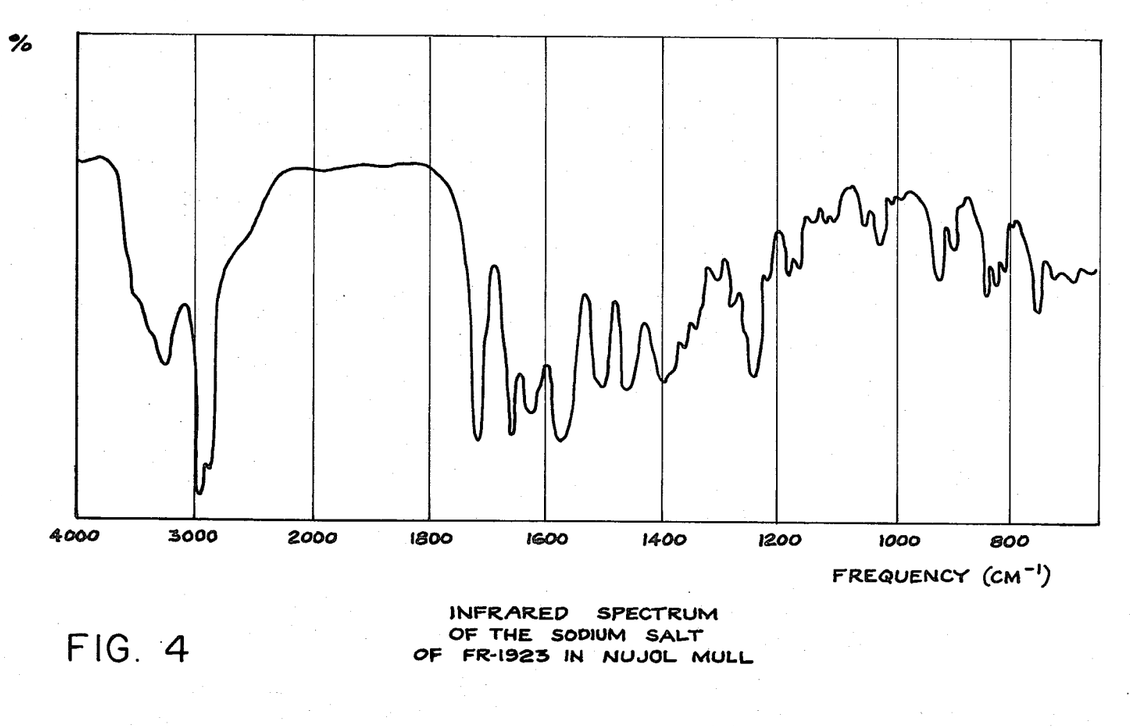

The infra-red absorption spectrum (suspended in Nujol mull) as shown in FIG. 4 gives peaks at the following frequency (cm$^{-1}$):

3450, 3400, 3250, 2750-2000, 1710, 1655, 1615, 1570, 1510, 1500, 1410, 1260, 1245, 1050, 1025, 925, 900, 845, 830, 815, 755, 690

The colour reactions of the sodium salt of the FR-1923 substance are mentioned as follows: Positive in nihydrin, Dragendorff's and ferric chloride-potassium ferricyanide tests; and negative in Ehrlich's, Molisch's, Fehling and Tollen's tests.

The Rf values of the sodium salt of the FR-1923 substance in thin layer chromatography on cellulose (using cellulose plate made by Merck) were determined, using n-butanol solution of ninhydrin as a colouring agent. The Rf values are shown in the following table.

Table:

| The Rf values of the sodium salt of the FR-1923 suubstance | |
|---|---|
| Solvent System | Rf |
| n-butanol: acetic acid: water (4:1:2) | 0.34 |
| n-butanol: methanol: 10% aqueous ammonium (10:2.5:5) | 0.16 |

Nuclear magnetic reasonance spectrum of the sodium salt of the FR-1923 substance gives the following signals ($\delta$ (ppm), in deutrium).

| | |
|---|---|
| 2.4 | : 2H multiplet |
| 3.2 | : 1H multiplet |
| 3.85 – 4.1 | : 2H multiplet |
| 4.3 | : 2H triplet |
| 5.0 | : 1H multiplet |
| 5.4 | : 1H singlet |
| 6.8 – 7.6 | : 8H multiplet |

The antibiotic FR-1923 substance and its alkali metal salts, produced by methods of this invention, have been found to possess a specific antibiotic spectrum, showing extremely useful activity against gram-negative bacteria, including the genera Pseudomonas, Proteus, Salmonella, Shigella and Sarcina. Accordingly, the antibiotic FR-1923 substance and its alkali metal salts may be useful in treatment of infectious disease caused such bacteria in mammals. The antibacterial and pharmacological tests are mentioned as follows:

Minimum Inhibitory Concentration (M.I.C.)

M.I.C. test was conducted by the usual serial agar dilution method, using a heart infusion agar which was incubated at 37°C. for 20 hours. M.I.C. value is expressed as the minimum concentration of the antibiotic FR-1923 substance (mcg/ml) which inhibits growth of the microorganism. The results are as follows:

| Test Microorganisms | M.I.C. (mcg/ml) |
|---|---|
| Staphylococcus aureus 209P | > 800 |
| Bacillus subtilis ATCC 6633 | 50 |
| Sarcina lutea PCI-1001 | 6.25 |
| Diplococcus pneumoniae III | 100 |
| Streptococcus hemolyticus S-23 | 200 |
| Corynebacterium diphtheriae PW-8 | 12.5 |
| Escherichia coli NIHJ JC-2 | 100 |
| Klebsiella aerogenes NCTC-418 | 200 |
| Proteus vulgaris IAM-1025 | 3.13 |
| Pseudomonas aeruginosa IAM-1095 | 400 |
| Salmonella typhi 0-901 | 50 |
| Shigella sonnei I EW-33 | 3.3 |

Protecting Effect in Experiemental Mice Infections

The activity of FR-1923 substance (sodium salt) in vivo against the species Pseudomonas aeruginosa was tested, using ICR-strain male mouse having a given weight. For comparison, carbenicillin (CB-Pc) was used.

Two groups, each of which consists of ten mice, were subcutaneously or intraperitoneally infected with a given number of cells of the species Pseudomonas aeruginosa, one group being used for protecting effect experiment and the other for control.

One hour after infection, each mouse of the experimental group, was subcutaneously administered once with the antibiotics, and each mouse of the control group was not treated with the antibiotics.

Animals in both of the groups were observed for death and survival for 10 days, and the results were calculated in terms of the median effect dose ($ED_{50}$). Incidentally, all of the infected, untreated control animals died within 48 hours after infection.

The results are as follows:

| Weight of Animal (g) | Organisms Infectious route and Amount of cells to be inoculated | Antibiotics | $ED_{50}$ (mg/mouse) |
|---|---|---|---|
| 27 – 30 | Ps. aeruginosa 724 subcutaneously; (2.0 × 10⁷/mouse) | FR-1923 (sodium salt) | 5.35 |
|  |  | CB-PC | 20.43 |
| 27 – 23 | Ps. aeruginosa 701 intraperitoneally; 2.3 × 10⁷/mouse | FR-1923 (sodium salt) | 7.89 |
|  |  | CB-PC | >48.0 |

Serum level and Urinary Excretion in animals after intramuscular administration

Animals were each administered intramuscularly with FR-1923 substance (sodium salt) at a single dose of 20 mg/kg. Blood specimens were collected 0.5, 1, 2, 3 and 5 hours after administration. Urine samples were collected over the periods of 0–3, 3–6 and 6–24 hours following the administration. The concentrations of FR-1923 substance in the serum and urine were assayed by a cup method. The results are as follows:

| Animal Species | Number used | Weight | Serum level: | | | | |
|---|---|---|---|---|---|---|---|
|  |  |  | 0.5hr. | 1hr. | 2hr. | 3hr. | 5hr. |
|  |  |  | mcg/ml | | | | |
| Rat | 5 | 190–210g | 18.2 | 9.4 | 1.4 | <0.6 | <0.6 |
| Rabbit | 6 | 2.4–3.5kg | 49.3 | 49.8 | 35.4 | 20.5 | 8.0 |
| Dog | 4 | 7.5–9.0kg | 34.6 | 40.6 | 16.2 | 5.1 | 1.7 |

| Animal Species | Number used | Weight | 0–3hr. | 3–6hr. | 6–24hr. | Urine Concentration: Total |
|---|---|---|---|---|---|---|
|  |  |  | mcg/ml (%) | | | mg/ml (%) |
| Rat | 5 | 190–210g | 16.6 (0.55) 3021 | 3.8 (0.1) 1353 | — | 0.0259 (0.7) 34.8 |
| Rabbit | 8 | 2.4–3.0kg | (42.7) 6025 | (18.7) 1634 | 8 | (64.4) 146.5 |
| Dog | 4 | 7.5–9.0kg | (75.9) | (12.8) | (0.2) | (88.9) |

Toxicity

Another and extremely important property of the antibiotic FR-1923 substance is that it appears to have extremely low toxicity as follows:

Acute toxicity (Single administration)

| Species | Sex | $LD_{50}$ (mg/kg)* | | | |
|---|---|---|---|---|---|
|  |  | i.v. | i.p. | s.c. | p.o. |
| Mouse | Male | 2100 | 2500 | 2900 | >8000 |
|  | Female | 2400 | 2500 | 3100 | >8000 |
| Rat | Male | >2000 | 2600 | 3100 | >8000 |
|  | Female | >2000 | 2800 | 5100 | >8000 |

*The animals were observed for 7 days after administration.

The antibiotic according to this invention may be formulated for administration in any convenient way by analogy with other antibiotic.

Thus, the composition of this invention can be used in the form of pharmaceutical preparation, for example, in solid, semisolid or liquid form, which contains the active FR-1923 substance or its alkali metal salts in admixture with a pharmaceutical organic or inorganic carrier or excipient suitable for external or inorganic carrier or excipient suitable for external or parenteral applications. The active ingredient may be compounded, for example, with usual carriers for tablets, pelets, capsules, suppositories, solutions, emulsions, aqueous suspensions, and other form suitable for use. The carriers which can be used are glucose, lactose, gum acacia, gelatin, mannitol, starch paste, magnesium trisilicate, talc, corn starch, keratin, colloidal silica, potato starch, urea and other carriers suitable for use in manufacturing preparations, in solid, semisolid, or liquid form, and in addition auxiliary, stabilizing, thickening and coloring agents and perfumes. The compositions of this invention can also contain preserving or bacteriostatic agents thereby keeping the active ingredient in the desired preparations stable in activity. The active FR-1923 substance or its alkali metal salt is included in the composition of this invention in an amount sufficient to produce the desired therapeutic effect upon the bacterially infected process or condition. While the dosage or therapeutically effective quantity of the antibiotic varies from and also depends upon the age and condition of each individual patient to be treated, a daily dose of about 0.5–5 g, preferably 1–2 g/day of the active ingredient is generally given for treating diseases against which the antibiotic are useful.

The following examples are illustrative of this invention, but it is to be understood they are not to be considered as limitative.

EXAMPLE 1

The vegetative medium has the following ingredients:

| Ingredients | Percentage by weight |
| --- | --- |
| Sucrose | 2 |
| Cottonseed meal | 2 |
| Dried yeast | 1 |
| Tap water | q.s. |

100 ml. of the medium in each of twenty-four 500 ml. flasks was sterilized by conventional methods and then inoculated with spores of Nocardia uniformis ATCC 21806. The organism was grown in the medium at 30°C for 48 hours on a shaker.

On the other hand, in a 500-liter stainless tank, there was placed 150 liters of a fermentation medium having the following ingredients:

| Ingredients | Percentage by weight |
| --- | --- |
| Glycerin | 3 |
| Cottonseed meal | 2 |
| Dried yeast | 2 |
| $KH_2PO_4$ | 2.18 |
| $Na_2HPO_4 \cdot 12H_2O$ | 1.43 |
| $MgCl_2 \cdot 6H_2O$ | 0.5 |
| Tap water | q.s. |

The fermentation medium was sterilized by a conventional method and then inoculated aseptically with the vegetative inoculum culture prepared above in an amount of 3 percent to a volume of the medium. The organism was grown for 24 hours at 30°C. During the growth period, the broth was stirred by a propeller operating at 220 r.p.m. and sterile air was passed through the broth at a rate of 150 liters per minute.

Thus prepared vegetative inoculum was aseptically inoculated in a 4000-liter stainless tank, in which 3000 liters of a fermentation medium having the same ingredient as used in the above 500-liter tank was placed and sterilized by a conventional method, in an amount of 5 percent to a volume of the medium.

The organism was grown in the fermentation medium for 72 hours at 30°C. During the growth period the broth was stirred with a propeller operating at 180 r.p.m. and sterile air was passed through the broth at a rate of 150 liters per minute.

After the fermentation was completed, 3 per cent "Radiolite" (trade name, a filter aid material sold by Showa Chemical Company) was added to the culture broth and the mixture was filtered to remove mycelia. To 2400 liters of the filtrate, there was added 24 kg. of activated carbon and the mixture was stirred for 15 minutes.

After the mixture was filtered, the activated carbon cake was washed with 500 liters of water and then extracted twice with 600 liters of a mixture of acetone, water and 25 percent aqueous ammonium solution (100:100:1). The extracts were combined and then concentrated to a volume of about 100 liters. To the concentrate was added "Duolite C-20" (trade name, made by Diamond Shamrock Chemical Co.) and adjusted to pH 3.0 and then filtered to remove precipitates. To the filtrate obtained was added 500 liters of water and then the solution was passed through a column packed with 80 liters of "Duolite A-6" (trade name, made by Diamond Shamrock Chemical Co.). The column was washed with 80 liters of water, 240 liters of 0.5N acetic acid and 240 liters of water in turn and then elution was carried out using 320 liters of a mixture of water, pyridine and acetic acid (100:10:1). The eluate was concentrated to a volume of about 20 liters and then 20 liters of a mixture of ethyl acetate and n-butanol (1:1) was added to the concentrate. After the solution was stirred for 15 minutes, the solution was allowed to stand and then the aqueous layer was separated. This operation was carried out twice. After 15 liters of the aqueous layer obtained was neutralized with 4N aqueous sodium hydroxide, the solution was concentrated to a volume of about 6 liters and the concentrate was adjusted to pH 2.5 to give pale brown precipitates. The precipitates obtained were washed with water and with acetone, and then dried to give 152 g. of pale brown powders. The powders were suspended in 2 liters of water and the suspension was adjusted to pH 7.5 with 4N aqueous sodium hydroxide. The solution was passed through a column packed with 1 liter of "DEAE Cephadex A-25" (trade name, made by Pharmacia Co.). Elusion was conducted with 3 liters of a 0.5 percent aqueous ammonium solution, and the eluate was adjusted to pH 2.5 with 4N aqueous hydrochloric acid to give 126 g. of crude, pale brown FR-1923 substance. The crude FR-1923 substance was then suspended in 900 ml. of water and the suspension was adjusted to pH 7.5 with an aqueous sodium hydroxide solution to dissolve it, and then 60 g. of activated carbon was added to the solution. The mixture was stirred for 15 minutes, and the activated carbon was filtered off. To the filtrate obtained was added 900 ml. of methanol, and the solution was adjusted to pH 2.5 with 4N hydrochloric acid to give 106 g. of the FR-1923 substance as white needles.

EXAMPLE 2

Fermentation was carried out in the same manner as described in Example 1. After the fermentation was completed, the culture broth, to which 6 percent "Radiolite" was added, was filtered to remove the mycelium.

The filtrate (3600 liters) obtained was adjusted to pH 3.0 with 4N hydrochloric acid to give precipitates and the precipitates were filtered off. To the filtrate was added 2160 kg. of ammonium sulfate and 1200 liters of acetone.

The mixture was stirred for 15 minutes and allowed to stand, and the acetone layer was separated. This operation was repeated twice. The acetone layers were combined and concentrated to smaller volume.

The concentrate was adjusted to pH 2.0 with 4N hydrochloric acid, and 50 liters of n-butanol was added thereto. The solution was stirred for 15 minutes and allowed to stand and then the n-butanol layer was separated. This operation was repeated six times. The n-butanol layers were combined, and 30 liters of water was added to the solution. After the solution was neutralized with 4N aqueous sodium hydroxide, the solution was stirred for 15 minutes and allowed to stand and then the aqueous layer was separated. The aqueous layer was combined and the solution adjusted to pH 2.0 with 4N hydrochloric acid. To the solution was added 40 liters of a mixture of ethyl acetate and n-butanol (1:1) and the solution was stirred for 15 minutes and allowed to stand, and then the aqueous layer was separated. This operation was repeated twice. The aqueous layers were combined, neutralized with 4N aqueous sodium hydroxide and then concentrated to a volume of about 6 liters. The concentrate was adjusted to pH 2.5 with 4N hydrochloric acid to give 235 g. of dark brown powders. The powders were suspended in 3 liters of water, and the suspension was adjusted to pH 7.5 with 4N aqueous sodium hydroxide. The solution was passed through and adsorbed on a column packed with "DEAE Cephadex A-25." Elution was carried out with a 0.5 percent aqueous ammonium solution, and the eluate was adjusted to pH 7.5 with 4N hydrochloric acid. To the solution was added 100 g. of activated carbon, and the mixture was stirred for 15 minutes. The activated carbon was filtered off, and to the filtrate was added 1 liter of methanol. The solution was adjusted to pH 2.5 with 4N hydrochloric acid to give 170 g. of FR-1923 substance as clorless needles.

EXAMPLE 3

Fermentation was carried out in the same manner as described in Example 1. After fermentation was completed, the culture broth was filtered to remove the mycelium, the filtration being assisted by use of 6 per cent "Radiolite."

To the filtrate (2,830 liters) was added 200 liters of n-butanol, and the solution was stirred for 30 minutes and then concentrated to a volume of about 660 liters. The concentrate was adjusted to pH 2.0 with 4N hydrochloric acid to give precipitates. The precipitates were filtered off, and to the filtrate was added 330 liters of n-butanol. The solution was stirred for 15 minutes and allowed to stand, and then the n-butanol layer was separated. This operation was repeated three times. To the combined n-butanol layer was added 100 liters of water, and the solution was neutralized with 4N aqueous sodium hydroxide. The solution was stirred for 15 minutes and allowed to stand, and then the aqueous layer was separated. This operation was repeated twice. The combined aqueous layer was adjusted to pH 2.0 with 4N hydrochloric acid and to the aqueous solution was added 200 liters ethyl acetate. The solution was stirred for 15 minutes and allowed to stand, and then the aqueous layer was separated. This operation was repeated twice. The combined aqueous layer was neutralized with 4N aqueous sodium hydroxide, and the solution was concentrated to a volume of about 23 liters. The concentrate was adjusted to pH 2.5 with 4N hydrochloric acid to give dark brown precipitates. The precipitates obtained were washed with water and then with acetone to give 820 g. of dark brown powders.

The powders were suspended in 3 liters of water and the suspension was adjusted to pH 7.5 with 4N aqueous sodium hydroxide. The solution was passed through a column packed with "DEAE Cephadex A-25." Elusion was carried out with 0.5 percent aqueous ammonium and the eluate was adjusted to pH 7.5 with 4N hydrochloric acid. To the solution was added 100 g. of activated carbon and the mixture was stirred for 15 minutes. The activated carbon was filtered off and to the filtrate was added 1 liter of methanol. The solution was adjusted to pH 2.5 with 4N hydrochloric acid to give precipitates 220 g. of FR-1923 substance as colorless needles.

FR-1923 substance (100 g.) was suspended in 1 liter of water and the suspension was adjusted to pH 7.0 with 4N aqueous sodium hydroxide to dissolve it and then to the solution was added 4 liters of acetone to give precipitates. The precipitates were separated to provide 80 g. of sodium salt of the FR-1923 substance as white, fine powders.

EXAMPLE 4

Preparation of an injectable solution.

The required quantities of sterile antibiotic FR-1923 substance (sodium salt) and sterile urea were weighted. They were uniformly mixed and distributed into vials, thereby containing 250 mg. of the active ingredient. The vials were sealed hermetically to exclude bacteria. Whenever the vials are required for use, an appropriate amount of a sterile pyrogen-free water is added to the vials.

EXAMPLE 5

Tablet

A suitable formulation of a tablet has the following ingredients:

| Ingredients | Parts |
| --- | --- |
| FR-1923 substance | 2 |
| Mannitol | 90 |
| Starch | 6 |
| Magnesium stearate | 2 |

EXAMPLE 6

Suppository

A suitable formulation of a suppository has the following ingredients:

| Ingredients | Parts |
| --- | --- |
| FR-1923 substance (sodium salt) | 2,500 |
| Ethylenediaminetetraacetic acid disodium salt dihydrate | 90 |
| Witepsol H$_{12}$ (Registered Trade Mark) | 124,000 |

We claim:
1. An antibiotic substance, FR-1923, effective in inhibiting the growth of bacteria, said FR-1923 substance:
   a. being amphoteric;
   b. being in the form of white crystalline needles;
   c. being very soluble in alkaline solution or dimethylsulfoxide, sparingly soluble in water or methanol, and insoluble in chloroform, ethyl acetate or ethyl ether;
   d. having the following elementary analysis:
      carbon = 54.31, hydrogen = 4.90
      nitrogen = 10.71, oxygen = (by difference) 30.08:
   e. having the following molecular formula:
      $C_{23} H_{24} N_4 O_9$ f. gradually changing on heating to brown at 187°C. and decomposing at 214–216°C;

g. having an ultra-violet absorption spectrum, when measured in 0.5 M phosphate buffer (pH 8.0), with a shoulder at 220 mμ and a maximum at 272 mμ ($E_{1cm}^{1\%} = 310$) as shown in FIG. 1;

h. having an infra-red absorption spectrum, when suspended in a Nujol mull, giving the following frequency (cm$^{-1}$) as shown in FIG. 2:
3450, 3250, 3200, 2700-2550, 1725, 1655, 1605, 1590, 1560, 1510, 1395, 1260, 1240, 1220, 1175, 1045, 930, 840, 810, 720; and i. showing the following color reactions: positive in ninhydrin, Dragendorff's and ferric chloride-potassium ferricyanide tests, and negative in Ehrlich's, Molisch's, Fehling and Tollen's tests.

2. The alkali metal salts of the antibiotic substance, FR-1923, according to claim 1.

3. The sodium salt of the antibiotic substance, FR-1923, according to claim 1.

4. A process for the production of the antibiotic substance according to claim 1, which comprises cultivating under aerobic conditions the strain Nocardia uniformis var. tsuyamanensis ATCC 21806 in a culture medium containing assimilable sources of carbon, nitrogen and inorganic salts at a temperature of about 20°C to 40°C for about 30 to 50 hours, and recovering, isolating and purifying the antibiotic.

5. A process according to claim 4 wherein the temperature is about 30° C.

6. A process according to claim 4 wherein the FR-1923 substance is recovered in the form of a pharmaceutically acceptable salt thereof.

7. A process according to claim 6 wherein the salt is an alkali metal salt.

8. A process according to claim 7 wherein the alkali metal is sodium.

* * * * *

UNITED STATES PATENT OFFICE
CERTIFICATE OF CORRECTION

Patent No. 3,923,977　　　　　　　　　Dated December 2, 1975

Inventor(s) Aoki et al.

It is certified that error appears in the above-identified patent and that said Letters Patent are hereby corrected as shown below:

Column 8, line 19, "16.6" should read --17.7--;
　　　　　line 58, "pelets" should read --pellets--;
Column 11, line 31, "clorless" should read --colorless--;
Column 12, line 22, "weighted" should read --weighed--.

Signed and Sealed this

Seventh Day of September 1976

[SEAL]

*Attest:*

RUTH C. MASON
*Attesting Officer*

C. MARSHALL DANN
*Commissioner of Patents and Trademarks*